March 7, 1967 T. B. BURNETT 3,308,310
ELECTRICAL SUPERCONDUCTIVE SWITCHES
Filed Sept. 4, 1964 5 Sheets-Sheet 4

3,308,310
ELECTRICAL SUPERCONDUCTIVE SWITCHES
Thomas Brian Burnett, Stafford, England, assignor to The English Electric Company Limited, London, England, a British company
Filed Sept. 4, 1964, Ser. No. 394,450
Claims priority, application Great Britain, Sept. 12, 1963, 35,983/63
9 Claims. (Cl. 307—88.5)

This invention relates to electrical switches.

An object of this invention is to provide a novel form of switch for use in high-power electrical circuits.

Another object of the invention is to provide a practical form of construction of the novel form of switch.

Figure 1:
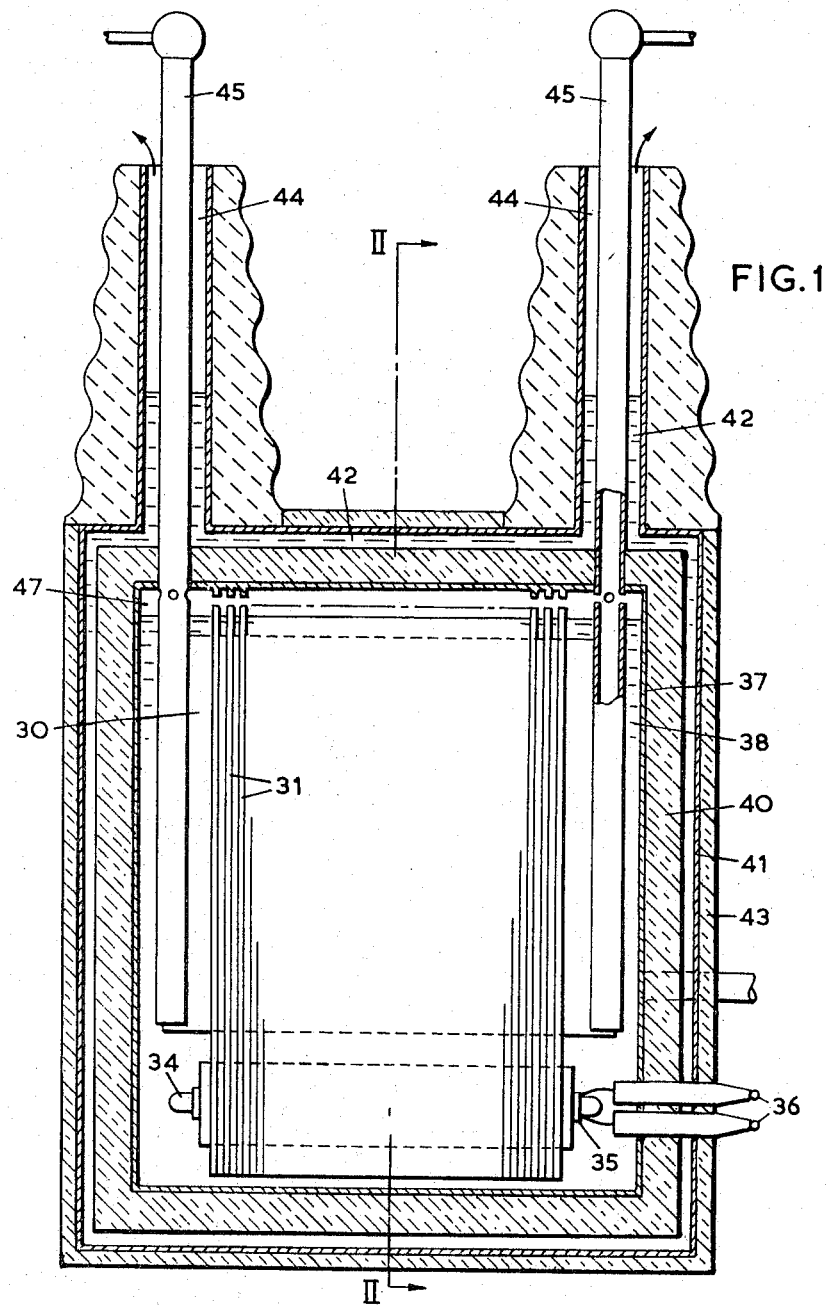
Figure 2:
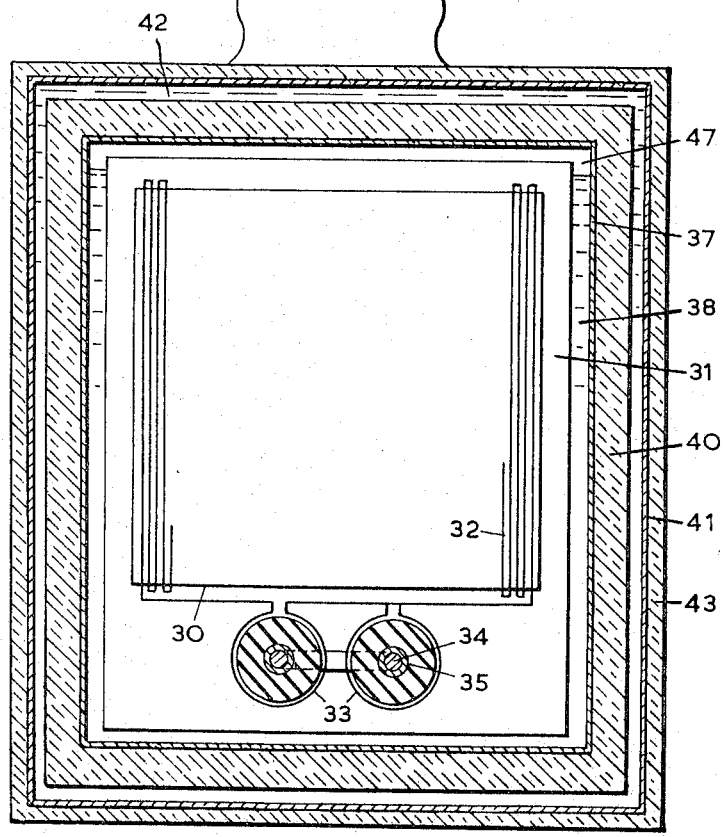
Figure 3:
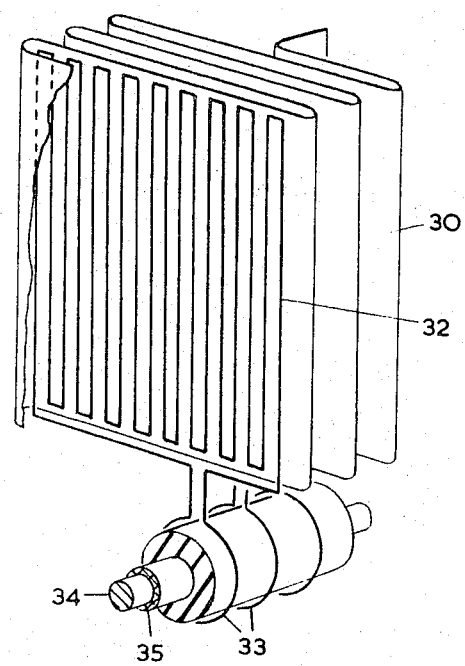
Figure 4:
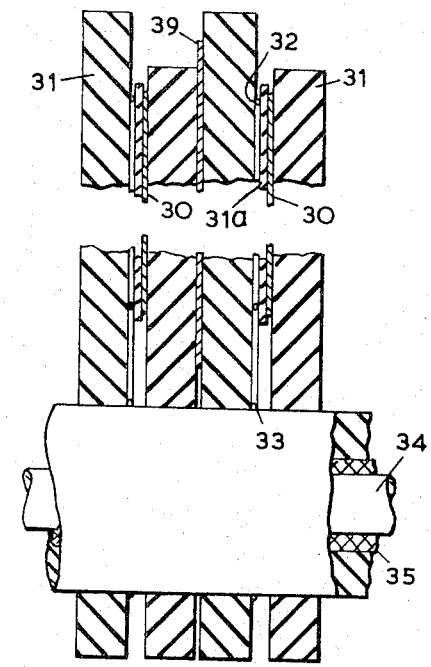
Figure 5:
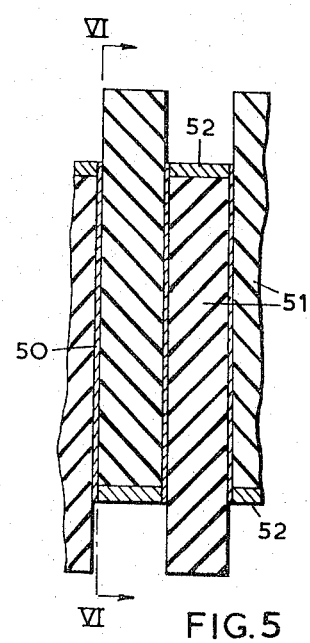
Figure 6:
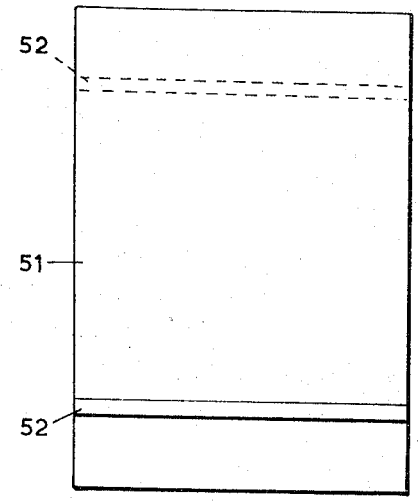
Figure 7:
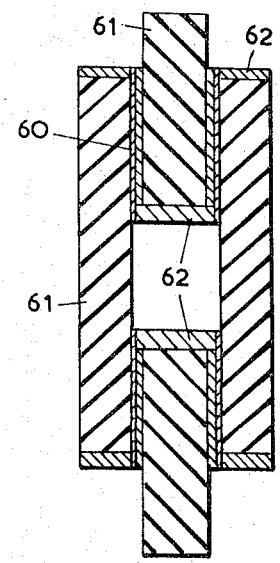
Figure 8:
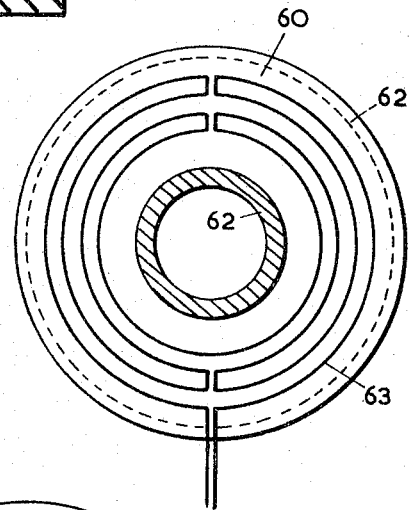
Figure 9:
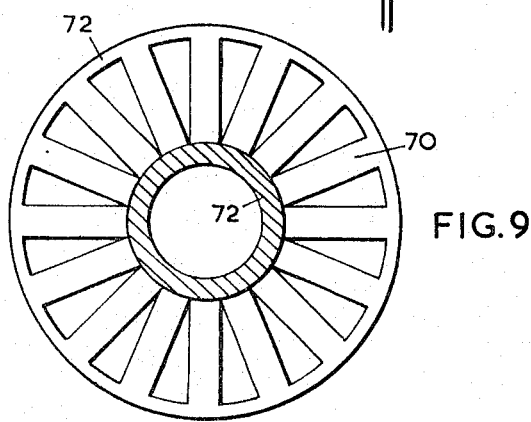
Figure 10:
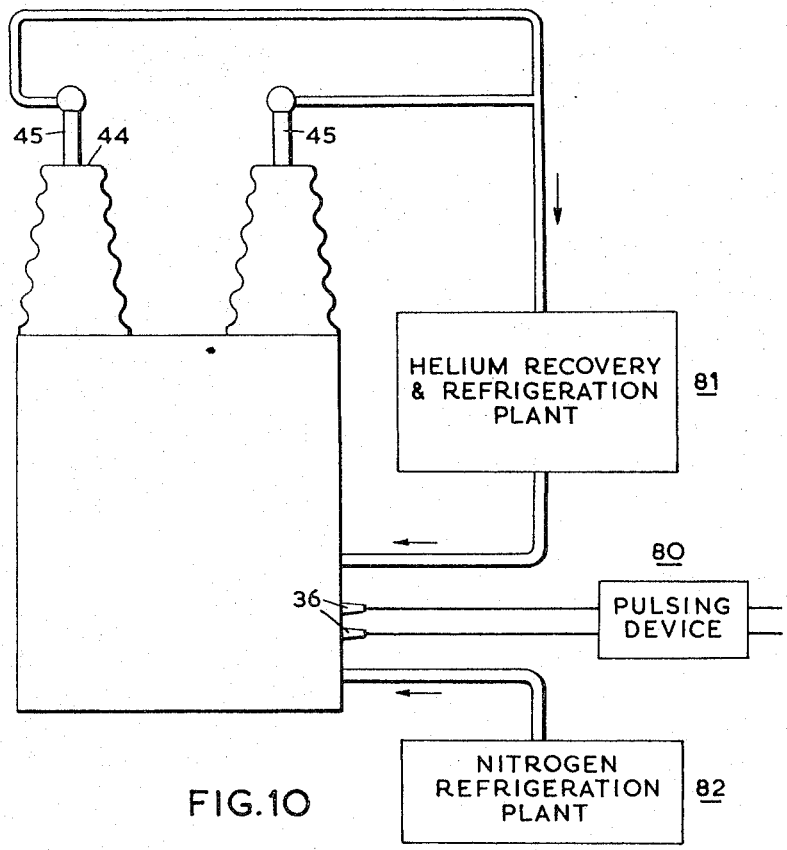

A number of embodiments of this invention will now be described by way of example with reference to the accompanying drawings, of which:

FIG. 1 is a diagrammatic view in section of an electrical switch in accordance with the invention, FIG. 2 is a section on the line II—II of FIG. 1, FIG. 3 is a diagramamtic perspective view illustrating the construction of part of the switch of FIGS. and 2, FIG. 4 is a detail view of part of FIG. 1 on a larger scale, FIG. 5 is a detail view showing an alternative arrangement, FIG. 6 is a section on the line VI—VI of FIG. 5, FIG. 7 is a view corresponding to FIG. 5 of another alternative arrangement, FIG. 8 shows one form of the control winding for the arrangement of FIG. 7, FIG. 9 shows yet another arrangement of the superconductor element, and FIG. 10 shows diagrammatically the connections of the switch to a pulsing device and refrigeration plants.

Referring now to FIGS. 1, 2, 3 and 4, there is shown one practical embodiment of a superconducting switch.

This includes a conductor element in the form of a long continuous niobium film 30, for example $10^{-5}$ cm. thick, 140 cm. wide and 170,000 cm. long, folded into 1,200 layers or convolutions. The view of FIGS. 1 and and 4 shows a transverse section through the layers, and FIG. 2 shows the extent of one layer. The folds of the film are separated by sheets of insulating material 31, and adjacent each fold but separated from it by a thin sheet of insulating material $31a$ (FIG. 4) is a control winding 32 which extends back and forth across the fold in a rectangular pattern (FIGS. 2 and 3). The free ends of the control winding 32 are connected to the secondary 33 of a pulse transformer. The latter has a core 34 and a primary winding 35 which is taken out to control terminals 36. The control terminals 36 are connected to a device 80 of any known or convenient kind to supply an accurately-timed pulse a short time, e.g. ten microseconds, before current zero. It will be apparent that there are substantially the same number of control windings 32, and transformer secondaries 33, as there are layers of the niobium film 30. The secondaries 33 may, for example, be wound alternately on the two limbs of the core.

The superconductor film 30, control windings 32 and pulse transformer 33, 34, 35 are immersed in a tank 37 containing liquid helium 38 so that the superconductor element 30 is maintained below its transition temperature, which for niobium is 9° K. The sheets 31 of insulating material are provided with copper thermal conductors 39 which project into the liquid helium 38 to remove heat from the insulating material after the passage of a current through the superconductor element 30. The helium tank 37 is surrounded by high-quality thermal insulation 40, and this in turn is surrounded by a tank 41 containing liquid nitrogen 42. The tank 41 is surrounded by a further layer of thermal insulation 43.

Suitable refrigerators 81, 82 (FIG. 10) are provided which respectively supply the liquid helium to tank 37 and the liquid nitrogen to tank 41. Evaporated nitrogen gas may be allowed to escape, for example through vents 44, and hollow copper tubes tube 45 are provided extending from the exterior of the nitrogen tank 41 to the interior of the helium tank 37. Helium gas which escapes from the helium tank 37 through the copper tubes 45 is led to the refrigeration plant 81 in which the helium is recovered and from which it is supplied in liquid form to the tank 37.

A space 47 is provided above the level of the liquid helium 38 within the tank 37 for helium gas resulting from boiling of the helium due to dissipation of energy during the passage of the current through the superconductor element 30 of the switch. The surfaces of the insulators 31 projecting into the space 47 may be ridged to provide the necessary electrical breakdown strength. A safety valve may be provided to operate in the event of the sudden evolution of quantities of helium gas. The copper tubes 45 also serve as the terminals of the superconducting switch, by which it is connected in an external circuit; the copper tubes are connected to the two ends of the superconductor element 30. In this case the pipes through which helium gas is led from the copper tubes 45 to the refrigeration plant 81 will be made of electrically-insulating material.

Referring now to FIG. 3, there is shown diagrammatically the manner in which the superconductor element 30 is folded. It will be appreciated that many of the other elements of the superconducting switch have been omitted from this view.

The arrangement of the control winding 32 is shown in FIGS. 3 and 4; the control winding is separated from the adjacent layer of the superconductor element 30 by a thin sheet of insulating material $31a$ and has the form of a wire of low resistivity wound back and forth across the fold of the superconductor element, transverse to the direction of the current flow through the element, in a rectangular pattern. The free ends of the control winding are connected to the secondary 33 of the pulse transformer, the primary winding 35 of which is connected to the control terminals 36. The primary and secondary windings are wound round a toroidal core 34, the primary winding 35 being insulated from the secondary winding 33.

FIG. 4 shows a small portion of the upper and lower ends of the stack formed by the superconductor element 30, the insulators 31 and the control winding 32. The core 34 and primary winding 35 of the pulse transformer co-operate with a plurality of control windings 32, e.g. one control winding 32 may be provided for each fold of the superconductor element 30.

FIGS. 5 and 6 show an alternative arrangement, in which, instead of the superconductor element being in the form of a long continuous film, it comprises a large number of separate rectangular layers 50 of film, adjacent layers being joined together by connecting strips 52 at their edges, so as to provide a continuous current path through the layers 50 of superconductor film in series. The layers 50 of superconductor film are separated, as in the previous embodiment, by sheets of insulating material 51, and the connecting strips 52 may be of superconductor material or of low-resistivity material, either brazed or soldered together or clamped together under pressure. The control winding is omitted in this view, for clarity, but is similar to that described with reference to FIGS. 1–4.

An embodiment of circular cross-section, is shown in FIGS. 7 and 8. In this arrangement the superconductor element is in the form of annular discs 60 separated alternately by full circular and annular insulating discs 61, and each superconductor disc is joined to the next disc in one direction at its inner edge and to the next disc in the other direction at its outer edge by means of connecting rings 62 which may be of superconductor material or of low-resistivity material, brazed, soldered or clamped as described in relation to FIGS. 5 and 6. The control winding 63 in such an arrangement may be arranged as shown in FIG. 8, and connected to a pulse transformer as described above.

Another arrangement of the superconductor element is shown in FIG. 9, the element 70 being composed of flat discs, from which sector-shaped pieces have been cut out, for example by stamping. In this embodiment the discs of the element will be connected to adjacent discs by means of connecting rings 72, arranged in a similar manner to rings 62 shown in FIGS. 7 and 8.

In operation, the superconducting element 30, 50, 60, 70, is normally maintained below its transition temperature, which in the case of niobium is 9° K., by means of the refrigeration plants 81, 82. The control winding is not energized and the superconducting switch is thus in the superconducting state and has substantially zero resistance.

When the control winding is energized a magnetic field is applied to the superconducting element and, provided the magnetic field is above the critical value, the superconducting element changes to its normal high-resistance state, when its resistance will rise from, for example, 100 ohms at 9° K. to 3,000 ohms at room temperature as a result of the current flowing, and will thus limit the current to relatively few amperes.

Owing to heating caused by the dissipation of energy resulting from the flow of current in the high-resistance state of the superconducting element (since at a line voltage of, say, 270 kv. the resistivity is not at present high enough to reduce the circuit current to a negligible value in a practical example) the current in the circuit should be interrupted by a conventional circuit-breaker as soon as it has been reduced to a small value by the superconducting switch. The energy dissipated is thus minimized.

The magnetic field applied to the superconductor element is then terminated, and the element is then allowed to cool below its transition temperature, when the superconducting switch returns to its superconducting state.

What I claim as my invention and desire to secure by Letters Patent is:

1. An electrical switch including a superconductor switching element having a plurality of layers of a superconducting material which has a transition temperature, a superconductive state, and a normal state, said layers being connected electrically in series, a plurality of layers of insulating material between said layers of superconducting material to insulate said layers of superconducting material from one another, a pair of terminals connected to said superconductor switching element, refrigeration means normally to maintain said superconducting material below its transition temperature, a plurality of control windings, each control winding being adjacent to a said layer of superconducting material, means insulating each control winding from the adjacent layer of superconducting material, pulse transformer means having primary winding means and a plurality of secondary winding means, each said secondary winding means being connected to a said control winding, and a pulsing device connected to said primary winding means to supply a pulse of current thereto, so as simultaneously to energize each of said plurality of secondary winding means, whereby when said primary winding is not energized, said plurality of control windings is not energized, and said superconducting material connected to said terminal is in said superconductive state, and whereby when said primary winding is energized by a said pulse of current, said plurality of control windings is energized, and said superconducting material connected to said terminals adopts said normal state.

2. An electrical switch as claimed in claim 1 wherein the superconductor switching element has at least twelve hundred layers of a superconducting material.

3. An electrical switch as claimed in claim 1 in which the superconductor switching element is continuous and is folded in at least a thousand convolutions in which said layers are formed by a continuous folded element.

4. An electrical switch as claimed in claim 1 in which the superconductor switching element has at least a thousand separate layers, and including connecting means abutting said separate layers and interconnecting said layers in series to provide a continuous current path therethrough.

5. An electrical switch as claimed in claim 4 wherein said layers of the superconductor switching element are rectangular.

6. An electrical switch as claimed in claim 4 wherein said layers of the superconductor switching element are annular discs.

7. An electrical switch as claimed in claim 4 wheein said layers of the superconductor switching element are flat circular discs from which sector-shaped pieces have been cut out.

8. An electrical switch as claimed in claim 1 wherein said superconductor switching element is of niobium film.

9. An electrical switch as claimed in claim 1 including also layers of thermally-conducting material provided in said layers of insulating material, and including a tank containing liquefied gas in which said superconductor switching element and said control winding means are immersed, said layers of thermally-conducting material projecting into said liquefied gas to remove heat from said insulating material.

References Cited by the Examiner

UNITED STATES PATENTS

| | | | |
|---|---|---|---|
| 2,832,897 | 4/1958 | Buck | 307—88.5 |
| 2,935,694 | 5/1960 | Schmitt et al. | 307—88.5 |
| 3,145,310 | 8/1964 | Bertuch et al. | 307—88.5 |

ARTHUR GAUSS, *Primary Examiner.*

J. ZAZWORSKY, *Assistant Examiner.*